US010237936B2

(12) United States Patent
Navabi-Shirazi et al.

(10) Patent No.: US 10,237,936 B2
(45) Date of Patent: Mar. 19, 2019

(54) SPLIT DRIVER BACKLIGHT SYSTEMS AND METHODS

(71) Applicant: Apple Inc., Cupertino, CA (US)

(72) Inventors: Mohammad J. Navabi-Shirazi, San Jose, CA (US); Alejandro Lara Ascorra, Gilbert, AZ (US); Asif Hussain, San Jose, CA (US); Ji Yeoul Ryoo, Cupertino, CA (US); Jingdong Chen, San Jose, CA (US); Jun Qi, San Jose, CA (US); Manisha P. Pandya, Saratoga, CA (US); Yanhui Xie, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/784,943

(22) Filed: Oct. 16, 2017

(65) Prior Publication Data

US 2019/0059136 A1 Feb. 21, 2019

Related U.S. Application Data

(60) Provisional application No. 62/546,456, filed on Aug. 16, 2017.

(51) Int. Cl.
*H05B 37/02* (2006.01)
*H05B 33/08* (2006.01)
*G02F 1/1335* (2006.01)
*G02F 1/13357* (2006.01)
*G02F 1/1343* (2006.01)

(52) U.S. Cl.
CPC ..... *H05B 33/0845* (2013.01); *H05B 33/0812* (2013.01); *H05B 33/0827* (2013.01); *G02F 1/1336* (2013.01); *G02F 1/133528* (2013.01); *G02F 1/134309* (2013.01); *G02F 2001/133601* (2013.01)

(58) Field of Classification Search
CPC ............ H05B 33/0812; H05B 33/0815; H05B 33/0845
USPC .................................................. 315/192, 193
See application file for complete search history.

(56) References Cited

U.S. PATENT DOCUMENTS

| 7,535,183 | B2 | 5/2009 | Gurr |
| 8,115,414 | B2 | 2/2012 | Zhao et al. |
| 8,169,245 | B2 | 5/2012 | Zhao |
| 8,994,615 | B2 | 3/2015 | Messmer et al. |

(Continued)

FOREIGN PATENT DOCUMENTS

KR    2017-0019978    2/2017

OTHER PUBLICATIONS

International Search Report and Written Opinion from PCT/US2018/000139, dated Oct. 31, 2018, 26 pages.

*Primary Examiner* — Tung X Le
(74) *Attorney, Agent, or Firm* — Morgan, Lewis & Bockius LLP

(57) ABSTRACT

Aspects of the subject technology relate to control circuitry for light-emitting diodes. The control circuitry may operate a light-emitting diode using a multi-peak pulse-width-modulation signal. The control circuitry may include a multi-stage driver having a relatively larger driver stage for providing a direct current through a light-emitting diode and a relatively smaller driver stage configured to cooperate with a pulse-width-modulation controller to pulse-width-modulate a current through the light-emitting diode.

19 Claims, 8 Drawing Sheets

(56) References Cited

U.S. PATENT DOCUMENTS

| | | |
|---|---|---|
| 2011/0032244 A1* | 2/2011 | Kataoka ............. H05B 33/0815 345/212 |
| 2011/0062872 A1* | 3/2011 | Jin ..................... H05B 33/0818 315/122 |
| 2011/0140615 A1* | 6/2011 | Min .................. H05B 33/0818 315/185 R |
| 2011/0175938 A1 | 7/2011 | Lee |
| 2012/0169417 A1* | 7/2012 | Sakai ................. H05B 33/0812 330/69 |
| 2013/0050289 A1 | 2/2013 | Kang et al. |
| 2013/0169172 A1* | 7/2013 | Kesterson .......... H05B 33/0815 315/186 |
| 2014/0009455 A1* | 1/2014 | Li ....................... G09G 3/3406 345/212 |
| 2014/0132173 A1* | 5/2014 | Zhang ................ H05B 33/0818 315/224 |
| 2014/0247295 A1 | 9/2014 | Hussain et al. |
| 2016/0232832 A1 | 8/2016 | Kang |

* cited by examiner

SPLIT DRIVER BACKLIGHT SYSTEMS AND METHODS

CROSS-REFERENCE TO RELATED APPLICATIONS

The present application claims the benefit of U.S. Provisional Patent Application Ser. No. 62/546,456, entitled "SPLIT DRIVER BACKLIGHT SYSTEMS AND METHOD," filed on Aug. 16, 2017, which is hereby incorporated by reference in its entirety for all purposes.

TECHNICAL FIELD

The present description relates generally to electronic devices with displays, and more particularly, but not exclusively, to electronic devices with displays having backlights.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels.

The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
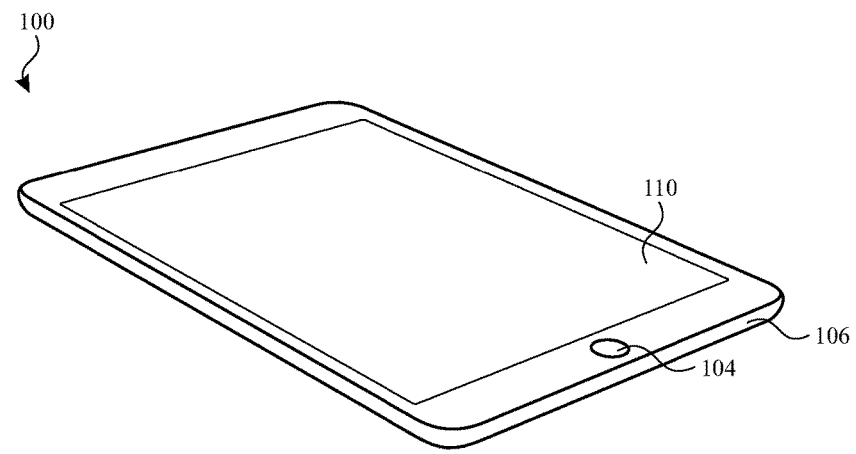
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, tablet computers, laptop computers, set-top boxes, smart watches, wireless access points, and other electronic equipment that include light-emitting diode arrays such as in backlight units of displays. Displays are used to present visual information and status data and/or may be used to gather user input data. A display includes an array of display pixels. Each display pixel may include one or more colored subpixels for displaying color images.

Each display pixel may include a layer of liquid crystals disposed between a pair of electrodes operable to control the orientation of the liquid crystals. Controlling the orientation of the liquid crystals controls the polarization of backlight from a backlight unit of the display. This polarization control, in combination with polarizers on opposing sides of the liquid crystal layer, allows light passing into the pixel to be manipulated to selectively block the light or allow the light to pass through the pixel.

The backlight unit includes one or more light-emitting diodes (LEDs) such as one or more strings and/or arrays of light-emitting diodes that generate the backlight for the display. In various configurations, strings of light-emitting diodes may be arranged along one or more edges of a light guide plate that distributes backlight generated by the strings to the LCD unit, or may be arranged to form a two-dimensional array of LEDs.

Although examples discussed herein describe LEDs included in display backlights, it should be appreciated that the LED control circuitry and methods described herein can be applied to LEDs implemented in other devices or portions of a device (e.g., in a backlit keyboard or a flash device).

Mixed mode dimming of LEDs is sometimes performed for LEDs that receive a common supply voltage, by individually controlling the current through one or more LEDs using multiple current control modes. Mixed-mode dimming includes directly controlling the current through one or more LEDs for LED currents above a knee point and controlling the current below the knee point using pulse-width modulation (PWM) of the current with a fixed peak current. The fixed peak current is equal to the knee point current, which is also the minimum of the directly controlled current.

For example mixed-mode dimming can be used for local dimming of display backlights to enhance the displayed content on the display (e.g., to enhance the brightness of bright regions of the displayed content by increasing backlight brightness and to provide darker dark regions of the displayed content by reducing backlight brightness in those regions).

Mixed mode dimming can be provided by an LED driver that includes a direct current supply (e.g., a digital-to-analog converter that operates a current-control transistor) and a PWM switch. However, providing mixed-mode dimming using a single DAC and a single PWM switch can have disadvantages in terms of power loss, current accuracy, susceptibility to noise, and driver area.

In accordance with various aspects of the subject disclosure, mixed mode dimming of LEDs includes PWM dimming using multiple peak currents (e.g., by varying a PWM duty cycle with each of two or more peak currents, modified using PWM on pulses). PWM dimming using multiple peak currents may help reduce headroom voltages at the end of one or more LED strings (e.g., the voltage at a location between a last LED in a series-coupled string of LEDs and current control circuitry for that string), which can reduce power consumption by the device.

In accordance with various aspects of the subject disclosure, mixed mode dimming of LEDs is provided using multiple drivers (e.g., a dual driver circuit having a relatively smaller driver stage for PWM dimming and a relatively larger driver stage for providing direct current control). A dual driver circuit for LEDs as described herein can provide a selectable and/or trimmable direct-to-PWM transition current and/or other advantages as discussed in further detail hereinafter.

An illustrative electronic device having light-emitting diodes is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations. An LED backlight array may also be provided for the keyboard and/or other illuminated portions of device 100.

In some implementations, electronic device 100 may be provided in the form of a computer integrated into a computer monitor. Display 110 may be mounted on a front surface of housing 106 and a stand may be provided to support housing (e.g., on a desktop).

Figure 2:
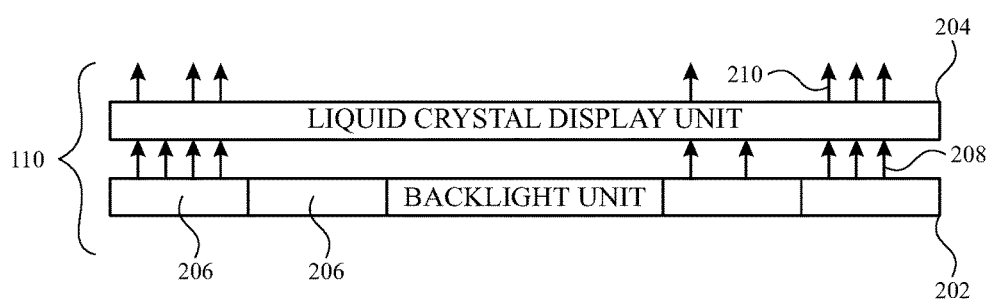
FIG. 2 illustrates a block diagram of a side view of an electronic device display having a backlight unit in accordance with various aspects of the subject technology.

FIG. 2 is a schematic diagram of display 110 in which the display is provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit 202 includes one or more subsections 206.

In some implementations, subsections 206 may be elongated subsections that extend horizontally or vertically across some or all of display 110 (e.g., in an edge-lit configuration for backlight unit 202). In other implementations, subsections 206 may be square or other rectilinear subsections (e.g., subarrays of a two-dimensional LED array backlight). Accordingly, subsections 206 may be defined by one or more strings and/or arrays of LEDs disposed in that subsection. Subsections 206 may be controlled individually for local dimming of backlight 208.

Although backlight unit 202 is shown implemented with a liquid crystal display unit, it should be appreciated that a backlight unit such as backlight unit 202 may be implemented in a backlit keyboard, or to illuminate a flash device or otherwise provide illumination for an electronic device.

Figure 3:
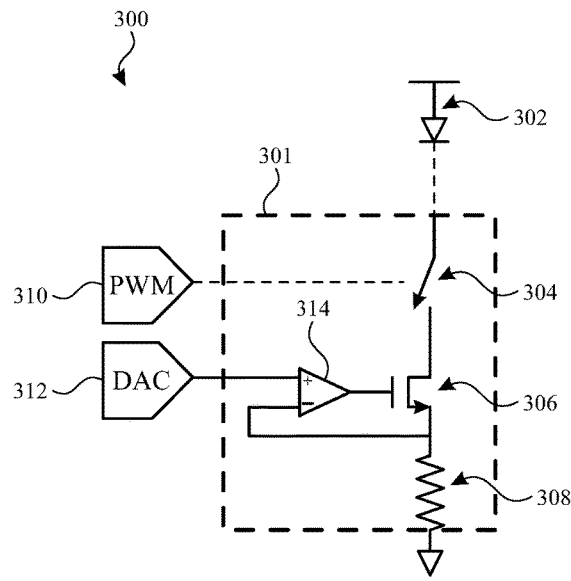
FIG. 3 illustrates a schematic diagram of light-emitting diode (LED) driver circuitry for direct and pulse-width-modulation (PWM) current control in accordance with various aspects of the subject technology.

FIG. 3 shows a schematic diagram of exemplary LED circuitry such as backlight circuitry for display 110. For example, LED circuitry 300 of FIG. 3 may be implemented in backlight unit 202 or other LED lighting devices. In the example of FIG. 3, circuitry 300 includes at least one LED 302 (e.g., an LED in a string of series-coupled LEDs) and an associated driver 301 for controlling the brightness of the LED.

In the example of FIG. 3, LED circuitry 300 includes switch 304, transistor 306, and resistor 308 coupled in series between LED 302 and a ground voltage. Switch 304 is operated by PWM driver 301. Transistor 306 is operated by controlling a gate voltage for the transistor with a selectable voltage reference 312 such as a digital-to-analog converter (DAC) coupled to the gate terminal. As shown in FIG. 3, an operational amplifier 314 may be coupled between DAC 312 and the gate terminal of transistor 306 to provide feedback control of the current through transistor 306. A first input terminal of amplifier 314 receives an output of DAC 312 and a second input terminal of amplifier 314 receives a residual voltage for comparison, by amplifier 314 to the input voltage from DAC 312. The output of amplifier 314 includes an output terminal coupled to the gate terminal of transistor 306. In the example of FIG. 3, the feedback voltage is a residual voltage at a location between transistor 306 and resistor 308.

Figure 4:
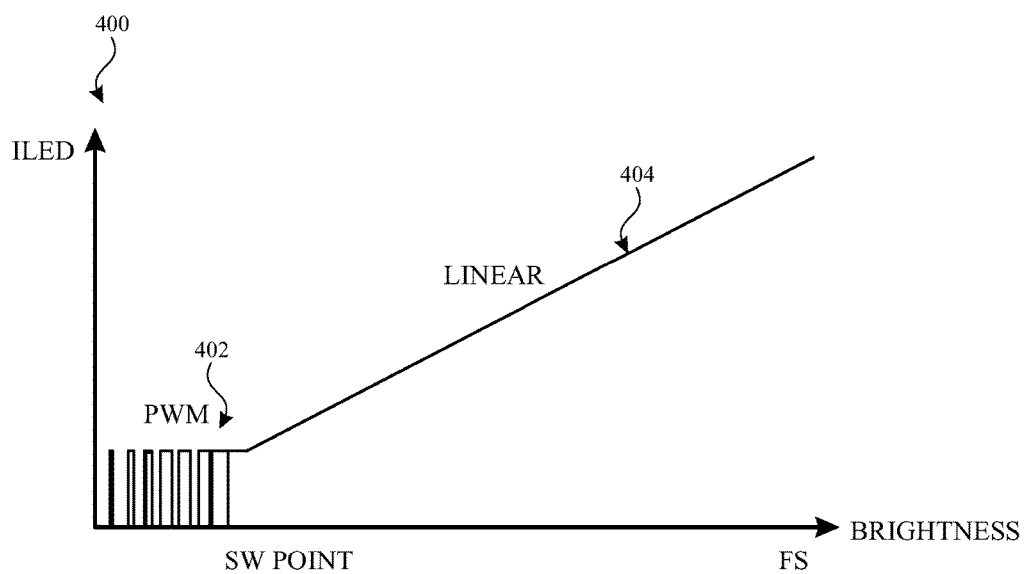
FIG. 4 illustrates a brightness control scheme for direct and PWM light-emitting diode (LED) currents in accordance with various aspects of the subject technology.

Driver 301 converts input brightness information to current levels to drive LEDs 302 (e.g., implemented in LED strings). LED current is controlled either using linear scaling of the current using DAC 312 to operate current control transistor 306 or by PWM control using PWM driver 310 at a fixed peak current to operate switch 304 such that average current through LED 302 is controlled by adjusting the duty cycle of a fixed frequency PWM waveform. FIG. 4 shows an example plot 400 of LED current ILED vs. LED brightness in which an LED is controlled using a PWM current 402 at low currents (e.g., currents below a knee point or switch (SW) point) and using linearly scaled current 404 at relatively high current (e.g., at currents above the knee point). PWM brightness control can help avoid color shifts at low LED current levels.

However, operating LED 302 using the currents illustrated in FIG. 4 with a single LED driver 301 as shown in FIG. 3 can have disadvantages, if care is not taken. For example, the headroom voltage at the end of one or more LED strings (e.g., at a location between the last LED 302 in the string and current control circuitry such as switch 304 and/or transistor 306 for that string) can be high causing unwanted power dissipation. As another example, in some scenarios, 12 bits of PWM resolution is desired which can lead to PWM duty cycles equal to approximately 0.025% (e.g., with an approximately 10 ns pulse width for a PWM frequency of 25 kHz). This can lead to relatively narrow pulses to achieve high resolution, which can become distorted in time.

Figure 5:
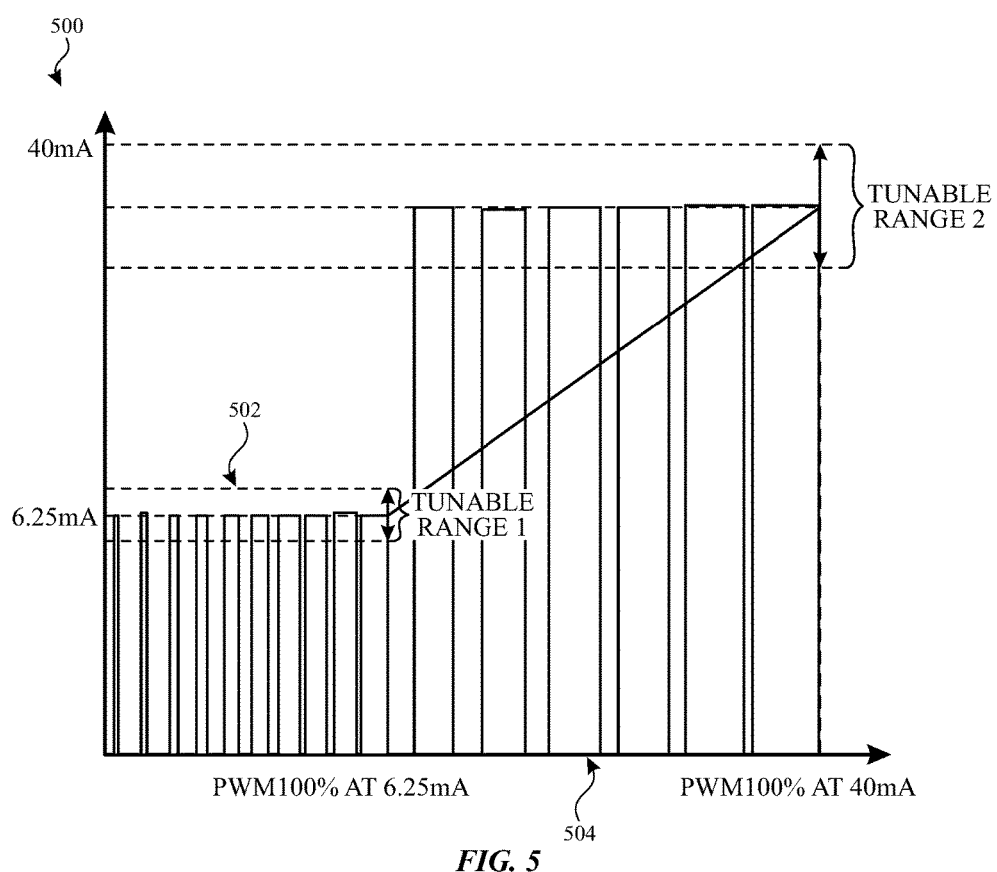
FIG. 5 illustrates a brightness control scheme for multi-peak PWM light-emitting diode (LED) currents in accordance with various aspects of the subject technology.

In accordance with some aspects of the subject disclosure, multi-peak PWM control of LED 302 can be performed, which can help reduce headroom voltage and power dissipation. FIG. 5 shows an example plot 500 of PWM-controlled LED currents 502 and 504 each having a different peak current (e.g., respective peak currents of approximately 6.25 milliamps (mA) and 33 mA). As indicated in FIG. 5, the two peak currents may be tunable to control the headroom voltage of the LED device.

Figure 6:
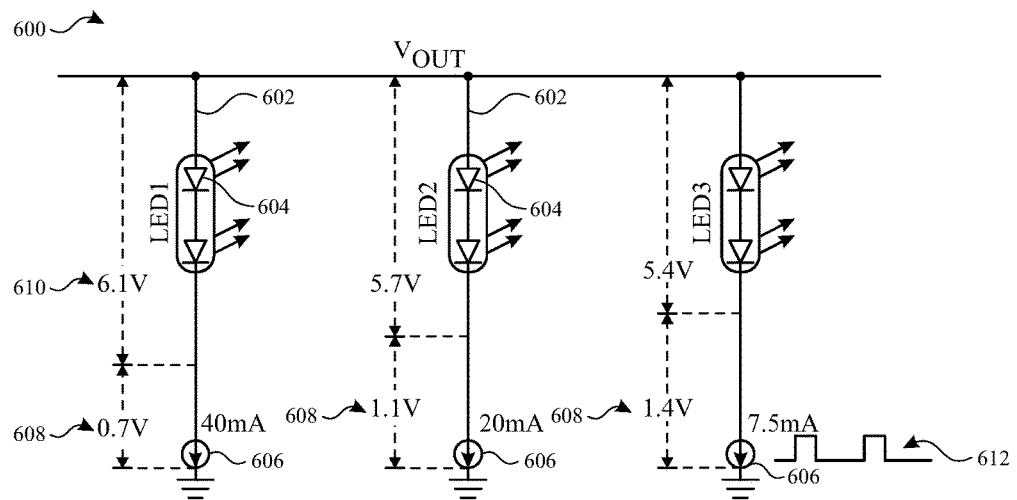
FIG. 6 illustrates LED headroom voltages generated using direct and PWM light-emitting diode (LED) currents in accordance with various aspects of the subject technology.

FIG. 6 shows example headroom voltages for three strings 602 of LEDs 604 of an LED device 600, operated with mixed mode dimming as shown in FIG. 3. In each string 602, one or more LEDs 604 are coupled in series between a supply voltage Vout and a current controller 606 (e.g., driver 301 of FIG. 3). Illustrative LED currents and resulting string voltages 610 and headroom voltages 608 are shown. In the example of FIG. 6, direct controlled LED currents of 40 mA and 20 mA result in string voltages 610 of 6.1 Volts (V) and 5.7 V and headroom voltages of 0.7 V and 1.1 V. A PWM current 612 of 7.5 mA results in string voltage of 5.4 V and a residual voltage of 1.4 V.

Figure 7:
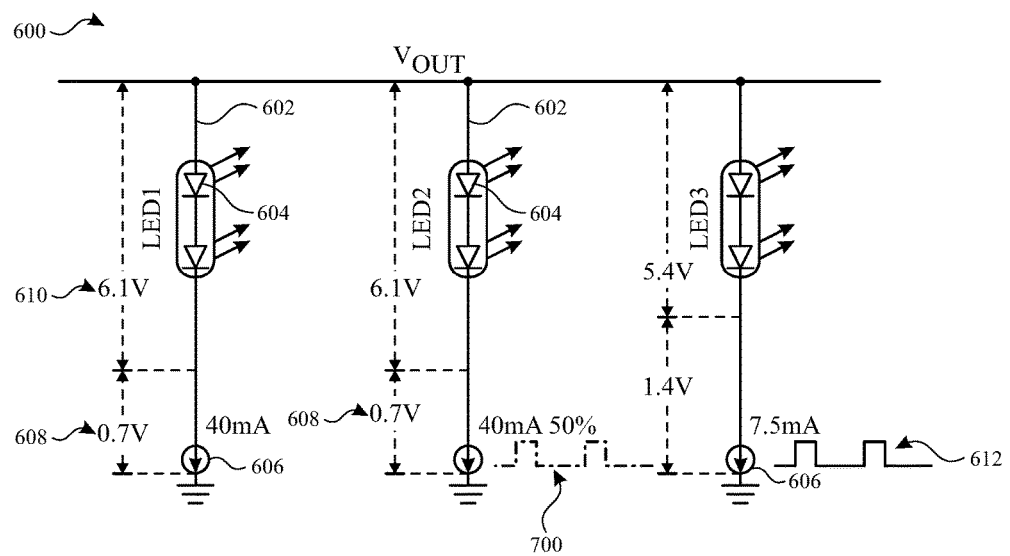
FIG. 7 illustrates LED headroom voltages generated using direct and multi-peak PWM light-emitting diode (LED) currents in accordance with various aspects of the subject technology.

As shown in FIG. 7, if the middle string 602 is instead operated with a 20 mA PWM current 700 generated by a 40 mA peak current with a 50% PWM duty cycle, the headroom voltage on that string is reduced to 0.7 V. As illustrated by FIGS. 6 and 7, operating LEDs using multi-peak PWM currents as in the example of FIG. 4, can facilitate the use of reduced headroom voltages which can reduce the overall power consumption of an LED device.

Figure 8:
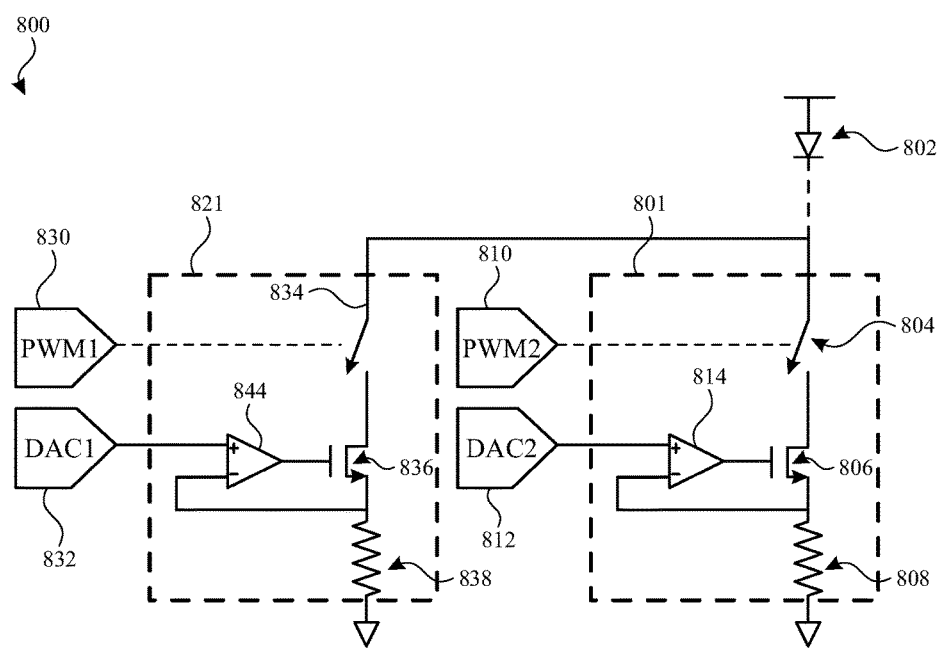
FIG. 8 illustrates a schematic diagram of light-emitting diode (LED) driver circuitry having multiple drivers each for providing direct and pulse-width-modulation (PWM) current control in accordance with various aspects of the subject technology.

The multi peak PWM control can be applied by changing the output of DAC 312 of FIG. 3 to raise and/or lower the fixed peak current, or can be provided by an LED driver circuit with multiple drivers. FIG. 8 shows an example of exemplary LED circuitry such as backlight circuitry for display 110 that includes multiple drivers. For example, LED circuitry 800 of FIG. 8 may be implemented in backlight unit 202 or other LED lighting devices. In the example of FIG. 8, circuitry 800 includes at least one LED 802 (e.g., an LED in a string of series-coupled LEDs) and associated drivers 801 and 821 (sometimes referred to as driver stages of an overall driver for LED 802), coupled in parallel between LED 802 and the ground voltage, for controlling the brightness of the LED.

In the example of FIG. 8, driver 801 includes switch 804, transistor 806, and resistor 808 coupled in series between LED 802 and the ground voltage. Switch 804 is operated by PWM driver 810. Transistor 806 is operated by controlling a gate voltage for the transistor with a digital-to-analog converter (DAC) 812 coupled to the gate terminal. As shown in FIG. 8, an operational amplifier 814 may be coupled between DAC 812 and the gate terminal of transistor 806 to provide feedback control of the current through transistor 806. A first input terminal of amplifier 814 receives an output of DAC 812 and a second input terminal of amplifier 814 receives a residual voltage for comparison, by amplifier 814 to the input voltage from DAC 812. The output of amplifier 814 includes an output terminal coupled to the gate terminal of transistor 806.

In the example of FIG. 8, driver 831 includes switch 834, transistor 836, and resistor 838 coupled in series between LED 802 and the ground voltage. Switch 834 is operated by PWM driver 830. Transistor 836 is operated by controlling a gate voltage for the transistor with a digital-to-analog converter (DAC) 832 coupled to the gate terminal. As shown in FIG. 8, an operational amplifier 844 may be coupled between DAC 832 and the gate terminal of transistor 836 to provide feedback control of the current through transistor 836. A first input terminal of amplifier 844 receives an output of DAC 832 and a second input terminal of amplifier 844 receives a residual voltage for comparison, by amplifier 844 to the input voltage from DAC 832. The output of amplifier 844 includes an output terminal coupled to the gate terminal of transistor 836.

Drivers 801 and/or 821 convert input brightness information to current levels to drive LEDs 802 (e.g., implemented in LED strings). When using driver 801 alone, LED current is controlled by linearly modifying the current from DAC 812 or by setting a fixed peak current using DAC 812 to operate current control transistor 806 and by reducing the average current through LED 802 by PWM control using PWM driver 810 to operate switch 804. When using driver 821 alone, LED current is controlled by linearly modifying the current from DAC 832, or by setting a fixed peak current using DAC 832 to operate current control transistor 836 and by reducing the average current through LED 802 by PWM control using PWM driver 830 to operate switch 834.

Driver 801 may be used when driver 821 is decoupled from LED 802 (e.g., with switch 834). Driver 821 may be used when driver 801 is decoupled from LED 802 (e.g., with switch 804). For example, one of drivers 801 and 821 may be a relatively larger than the other of drivers 801 and 821. For very low brightness, only the small driver may be operational to provide high resolution with lower distortion. In some scenarios, drivers 801 and 802 may both be operated to deliver LED current (e.g., for high brightness operations). In some scenarios, driver 801 and 821 may co-operate to provide multi-peak PWM control as described above in connection with FIG. 5.

For example, for a first LED brightness, DAC 812 can provide a first peak current (e.g., an adjustable peak current of about 5-10 mA) which can be reduced, on average, by PWM controller 810 to a first average current corresponding to the first LED brightness. For a second LED brightness, DAC 832 can provide a second peak current (e.g., an adjustable peak current of about 30-40 mA) which can be reduced, on average, by PWM controller 830 to a second average current corresponding to the second LED brightness.

In other scenarios, high resolution PWM dimming of LED 802 can be performed by inter-modulating the PWM control of drivers 801 and 821. In other scenarios, mixed mode dimming of LED 802 can be performed by using the smaller one of drivers 801 and 821 for PWM dimming and the larger of drivers 801 and 821 for the linear current control. In accordance with some aspects, mixed mode dimming of LEDs may be provided by a dual driver LED control circuit in which only one of the drivers is PWM controllable.

Figure 9:
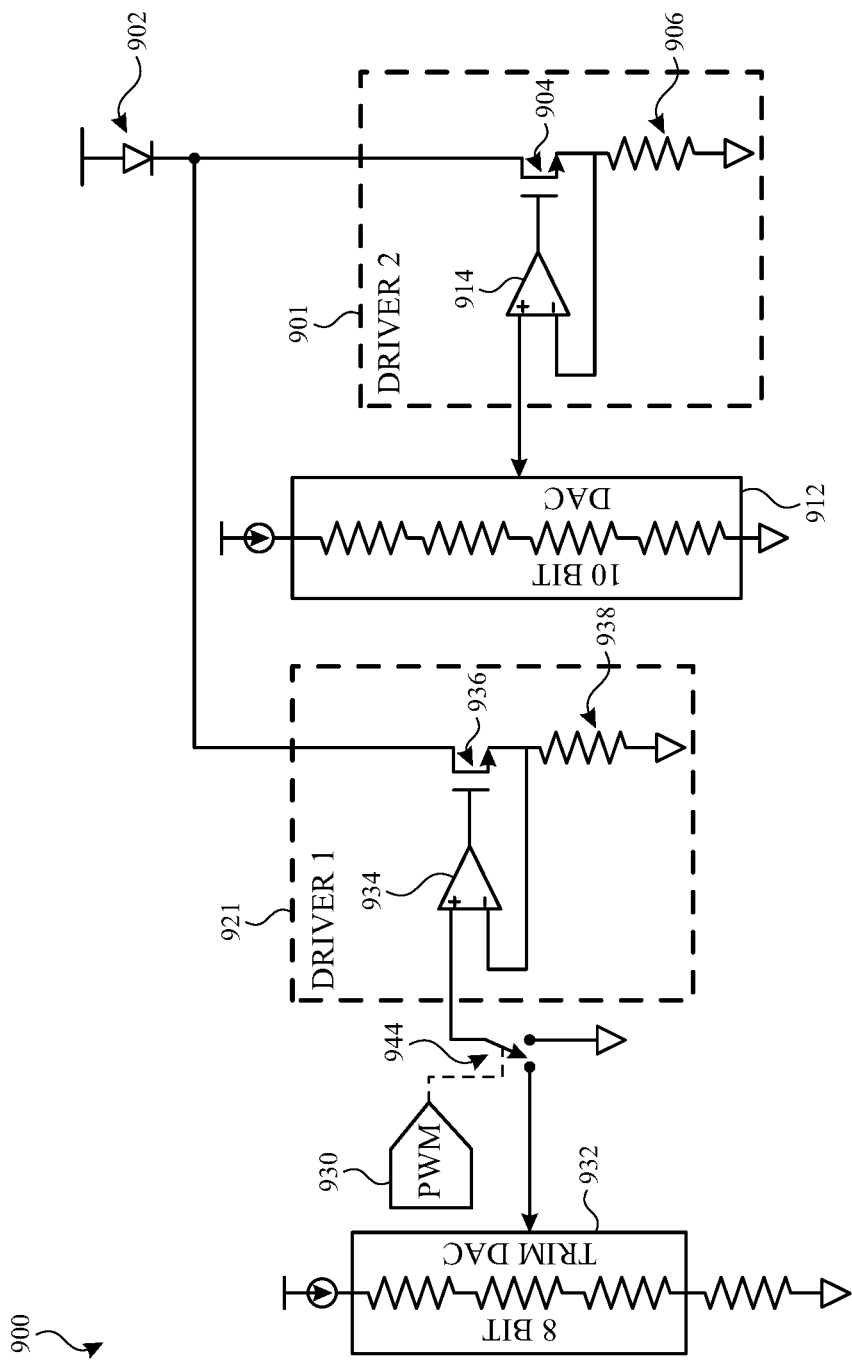
FIG. 9 illustrates a schematic diagram of light-emitting diode (LED) driver circuitry having a first driver for providing direct LED current control and a second driver for providing pulse-width-modulation (PWM) LED current control in accordance with various aspects of the subject technology.

FIG. 9 shows an example of LED circuitry such as backlight circuitry for display 110 that includes multiple drivers in which only one of the drivers is PWM controllable. In the example of FIG. 9, LED circuitry 900 includes a first driver 921 and a second driver 901 coupled in parallel between LED 902 and a ground voltage.

Driver 921 may be operated to provide PWM controlled current through LED 902 by operation of switch 944 by PWM controller 930 to selectively couple and decouple DAC 932 (e.g., an 8 bit DAC) from a first input terminal of operational amplifier 934. As shown, a second input terminal of operational amplifier 934 receives a feedback voltage for comparison to the PWM controlled voltage from DAC 932. The output terminal of amplifier 934 is coupled to the gate terminal of transistor 936 for controlling current through LED 902. PWM controller 930 may provide dithering (e.g., PWM controller may be a 14 bit controller that provides 10 bits PWM resolution and 4 bits dithering). The peak value of the current in the PWM cycle generated by driver 921 may be trimmed using DAC 932. DAC 932 may provide, for example, a peak current of 5-10 mA (e.g., 6.25 mA plus 20 percent).

Driver 901 may be operated to provide linear current control for higher LED currents through LED 902 (e.g., direct currents of up to between 30 mA and 40 mA, such as a 33.75 mA current). DAC 912 (e.g., a 10 bit DAC) selects the output current of linear driver 901. As shown, the output of DAC 912 can be provided to a first input terminal of an operational amplifier 914 that has an output terminal coupled to the gate terminal of transistor 904 (coupled in series between LED 902 and resistor 906). A second input terminal of amplifier 914 receives a feedback voltage from a location between transistor 904 and resistor 906.

Figure 10:
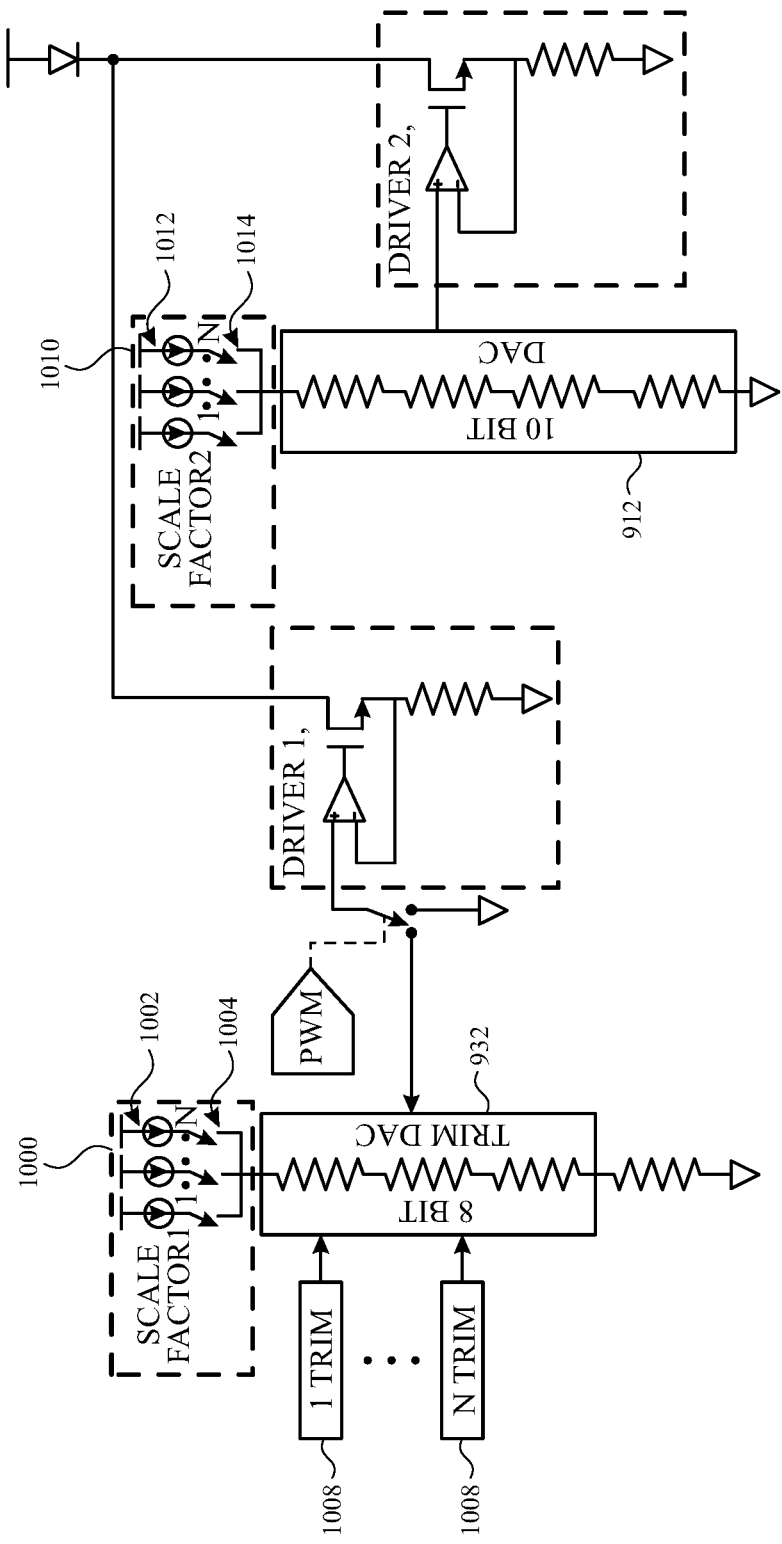
FIG. 10 illustrates a schematic diagram of light-emitting diode (LED) driver circuitry having current scaling circuitry for each of a first driver for providing direct LED current control and a second driver for providing pulse-width-modulation (PWM) LED current control in accordance with various aspects of the subject technology.

In order to provide additional control of drivers 901 and 921, current DACs (IDACs) such as IDACs 1000 and 1010 may be coupled, respectively to DACs 932 and 912 as shown in FIG. 10. In the configuration of FIG. 10, the transition point between PWM control by driver 921 and linear control by driver 901 may be selectable using IDAC 1000 (e.g., selectively coupling a current source 1002 to DAC 932 using switches 1004). In the configuration of FIG. 10, trimming of the transition point between PWM control by driver 921 and linear control by driver 901 may be performed using trim values 1008 for DAC 932. In the configuration of FIG. 10, analog control of the current through LED 902 can be performed using only DAC 912. In the configuration of FIG. 10, display-wide dimming of backlight unit 202 may be performed using IDAC 1010 (e.g., by selectively coupling a current source 1012 to DAC 912 using switches 1014). In various implementations, IDACs 1000 and 1010 may be coupled one or more drivers of one or more LEDs provide local or global transition point selection and/or global dimming for a display.

Figure 11:
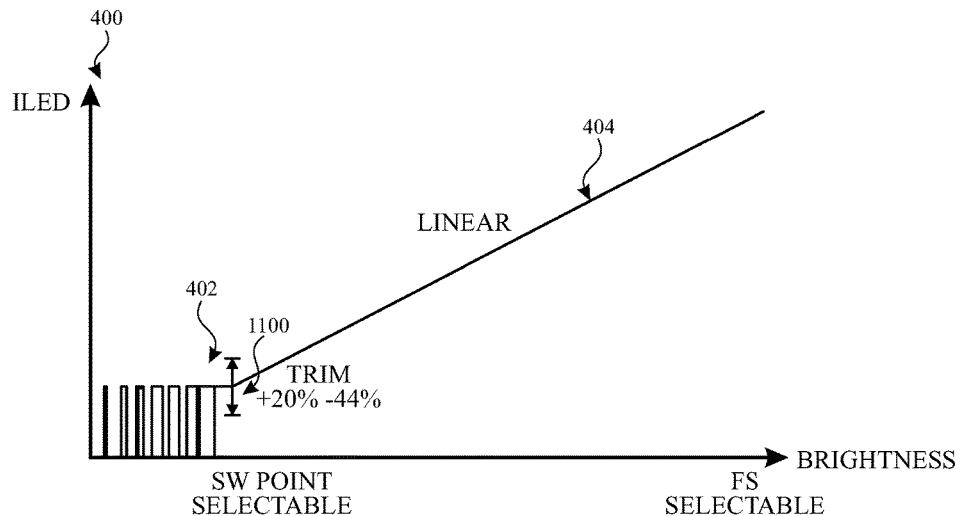
FIG. 11 illustrates a brightness control scheme for direct and PWM light-emitting diode (LED) currents with a trimmalbe and scalable knee point in accordance with various aspects of the subject technology.

LED circuitry as shown in FIG. 10 provides mixed mode current control, as shown by the current plot 400 of FIG. 11, in which PWM control is performed at low currents by driver 921, linear current control is provided at higher currents by driver 901, and the switch (SW) or transition point between PWM control and linear control is both trimmable (e.g., by +20%/−44%) and scalable. LED circuitry as shown in FIG. 9 and FIG. 10, as examples, can provide reduced power loss, better accuracy, better noise immunity, and a smaller driver area (e.g., for a 10 bit composite DAC/PWM driver relative to a 14 bit single DAC/PWM driver).

Figure 12:
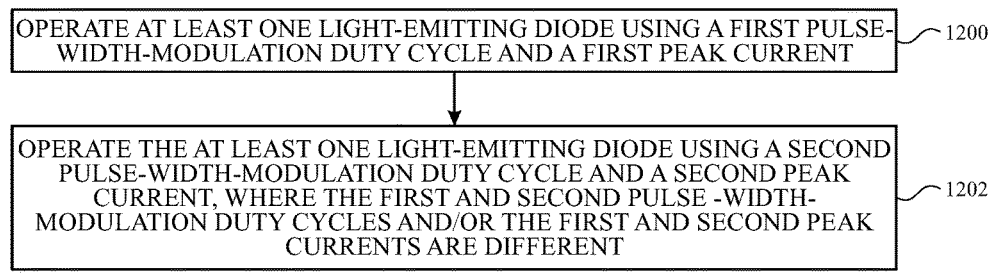
FIG. 12 is a flow chart of illustrative operations that may be performed for multi-peak PWM LED current control in accordance with various aspects of the subject technology.

FIG. 12 depicts a flow diagram of an example process for multi-peak PWM control of LED current in accordance with various aspects of the subject technology. For explanatory purposes, the example process of FIG. 12 is described herein with reference to the components of FIGS. 3 and 8-10. Further for explanatory purposes, the blocks of the example process of FIG. 12 are described herein as occurring in series, or linearly. However, multiple blocks of the example process of FIG. 12 may occur in parallel. In addition, the blocks of the example process of FIG. 12 need not be performed in the order shown and/or one or more of the blocks of the example process of FIG. 12 need not be performed.

In the depicted example flow diagram, at block 1200, at least one light-emitting diode is operated using a first pulse-width-modulation duty cycle and a first peak current. For example, the first PWM duty cycle and the first peak current may correspond to the duty cycles and/or peak current of PWM current 502 of FIG. 5.

At block 1202, the at least one light-emitting diode is operated using a second pulse-width-modulation duty cycle and a second peak current, where the first and second pulse-width-modulation duty cycles and/or the first and second peak currents are different. For example, the second PWM duty cycle and the second peak current may correspond to the duty cycles and/or peak current of PWM current 504 of FIG. 5.

Figure 13:
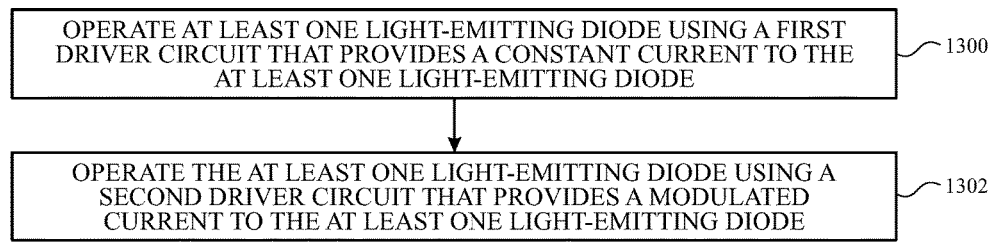
FIG. 13 is a flow chart of illustrative operations that may be performed for dual driver LED current control in accordance with various aspects of the subject technology.

FIG. 13 depicts a flow diagram of an example process for multi-peak PWM control of LED current in accordance with various aspects of the subject technology. For explanatory purposes, the example process of FIG. 13 is described herein with reference to the components of FIGS. 8-10. Further for explanatory purposes, the blocks of the example process of FIG. 13 are described herein as occurring in series, or linearly. However, multiple blocks of the example process of FIG. 13 may occur in parallel. In addition, the blocks of the example process of FIG. 13 need not be performed in the order shown and/or one or more of the blocks of the example process of FIG. 13 need not be performed.

In the depicted example flow diagram, at block 1300, at least one light-emitting diode is operated using a first driver circuit (e.g., driver 901 of FIG. 9 or FIG. 10) that provides a constant current to the at least one light-emitting diode.

At block 1302, the at least one light-emitting diode is operated using a second driver circuit (e.g., driver 921 of FIG. 9 or FIG. 10) that provides a modulated (e.g., PWM) current to the at least one light emitting diode.

In accordance with various aspects of the subject disclosure, an electronic device having a display with a backlight is provided, the backlight including a light-emitting diode and a backlight driver. The backlight driver includes a first driver stage coupled to the light-emitting diode and having a pulse-width modulation controller and a first linear current controller. The backlight driver also includes a second driver stage coupled to the light-emitting diode and having a second linear current controller.

In accordance with other aspects of the subject disclosure, an electronic device having a display is provided, the display including a backlight unit that includes a light-emitting diode, direct current control circuitry, and pulse-width-modulation current control circuitry to modulate a first current provided by the direct current control circuitry through the light-emitting diode and to modulate a second current provided by the direct current control circuitry through the light-emitting diode. The first current is larger than the second current.

In accordance with other aspects of the subject disclosure, a method is provided that includes operating at least one light-emitting diode using a first pulse-width-modulation duty cycle and a first peak current and operating the at least one light-emitting diode using a second pulse-width-modulation duty cycle and a second peak current. The first and second peak currents are different.

In accordance with other aspects of the subject disclosure, a method is provided that includes operating at least one light-emitting diode using a first driver circuit that provides a constant current to the at least one light-emitting diode and operating the at least one light-emitting diode using a second driver circuit that provides a modulated current to the at least one light-emitting diode.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device having a display with a backlight, the backlight comprising:
   a light-emitting diode; and
   a backlight driver having:
      a first driver stage coupled to the light-emitting diode and having:
         a pulse-width modulation controller; and
         a first linear current controller, wherein the first linear current controller comprises:
            a first current control transistor having a first source/drain terminal coupled to the light-emitting diode, a second source/drain terminal coupled to a ground voltage via a resistor, and a gate terminal; and
            a first digital-to-analog converter having an output terminal coupled to the gate terminal of the first current control transistor; and
      a second driver stage coupled to the light-emitting diode and having a second linear current controller.

2. The electronic device of claim 1, wherein the output terminal of the first digital-to-analog converter is coupled to the gate terminal of the first current control transistor, via a switch.

3. The electronic device of claim 2, wherein the pulse-width modulation controller is configured to operate the switch to provide pulse-width-modulation control of a current through the light-emitting diode and the first current control transistor.

4. The electronic device of claim 3, wherein the second linear current controller comprises:
   a second current control transistor having a first source/drain terminal coupled to the light-emitting diode, a second source/drain terminal coupled to the ground voltage via an additional resistor, and a gate terminal; and
   a second digital-to-analog converter having an output terminal coupled to the gate terminal of the second current control transistor.

5. The electronic device of claim 4, wherein the first linear current controller further comprise an amplifier coupled between the switch and the gate terminal of the first current control transistor.

6. The electronic device of claim 5, wherein the second linear current controller further comprise an additional amplifier coupled between the second digital-to-analog converter and the gate terminal of the second current control transistor.

7. The electronic device of claim 4, further comprising a first current digital-to-analog converter coupled to the first digital-to-analog converter.

8. The electronic device of claim 7, further comprising a second current digital-to-analog converter coupled to the second digital-to-analog converter.

9. An electronic device having a display, the display comprising:
   a backlight unit, comprising:
   a light-emitting diode;
   direct current control circuitry, wherein the direct current control circuitry comprises:
      a current control transistor coupled in series between the light-emitting diode and a ground voltage; and
      a digital-to-analog converter coupled to a gate terminal of the current control transistor; and
   pulse-width-modulation current control circuitry to modulate a first peak current provided by the direct current control circuitry through the light-emitting diode and to modulate a second peak current provided by the direct current control circuitry through the light-emitting diode, wherein the first peak current is larger than the second peak current.

10. The electronic device of claim 9, wherein the pulse-width-modulation current control circuitry comprises a switch coupled between the light-emitting diode and the current control transistor, the switch operable based on a pulse-width-modulation signal from a pulse-width-modulation controller.

11. The electronic device of claim 10, wherein the digital-to-analog converter is operable to provide the first peak current and the second peak current using the current control transistor, and wherein, in some modes of operation, the second peak current is unmodulated by the pulse-width-modulation current control circuitry.

12. The electronic device of claim 10, wherein the digital-to-analog converter is operable to provide the first peak current using the current control transistor and wherein the direct current control circuitry further comprises an additional digital-to-analog converter operable to provide the second peak current using an additional current control transistor.

13. The electronic device of claim 12, wherein the pulse-width-modulation current control circuitry further comprises an additional switch coupled between the light-emitting diode and the additional current control transistor.

14. A method of operating an electronic device, comprising:
   operating at least one light-emitting diode using a first pulse-width-modulation duty cycle and a first peak current; and
   operating the at least one light-emitting diode using a second pulse-width-modulation duty cycle and a second peak current, wherein the first and second peak currents are different,
   wherein operating at least one light-emitting diode using the first pulse-width-modulation duty cycle and the first peak current comprises providing the first peak current using a digital-to-analog converter and providing the first pulse-width-modulation duty cycle with a pulse-width-modulation controller.

15. The method of claim 14, wherein the first peak current is larger than the second peak current.

16. The method of claim 14, wherein operating at least one light-emitting diode using the second pulse-width-modulation duty cycle and the second peak current comprises providing the second peak current using the digital-to-analog converter and providing the second pulse-width-modulation duty cycle with the pulse-width-modulation controller.

17. The method of claim 14, wherein operating at least one light-emitting diode using the second pulse-width-modulation duty cycle and the second peak current comprises providing the second peak current using an additional digital-to-analog converter and providing the second pulse-width-modulation duty cycle with an additional pulse-width-modulation controller.

18. A method of operating an electronic device, comprising:
   operating at least one light-emitting diode using a first driver circuit that provides a constant current to the at least one light-emitting diode; and
   operating the at least one light-emitting diode using a second driver circuit that provides a modulated current to the at least one light-emitting diode,
   wherein the first driver circuit comprises a first digital-to-analog converter coupled to a first current control transistor for the at least one light-emitting diode,
   wherein the second driver circuit comprises a second digital-to-analog converter coupled to a second current control transistor for the at least one light-emitting diode, and
   wherein the first digital-to-analog converter is an N-bit digital-to-analog converter, wherein the second digital-to-analog converter is an M-bit digital-to-analog converter, and wherein N is greater than M.

19. The method of claim 18, wherein operating the at least one light-emitting diode using the second driver circuit that provides the modulated current to the at least one light-emitting diode comprises modulating a current from the second digital-to-analog converter using a switch coupled between the second digital-to-analog converter and the second current control transistor.

* * * * *